United States Patent
Sørensen (10) Patent No.: US 7,318,519 B2
(45) Date of Patent: Jan. 15, 2008

(54) TOTE FOR CONVEYOR

(75) Inventor: Brian Lynge Sørensen, Risskov (DK)

(73) Assignee: FKI Logistex A/S, Arhus N (DK)

( * ) Notice: Subject to any disclaimer, the term of this patent is extended or adjusted under 35 U.S.C. 154(b) by 0 days.

(21) Appl. No.: 10/491,105

(22) PCT Filed: Sep. 27, 2002

(86) PCT No.: PCT/DK02/00642

§ 371 (c)(1),
(2), (4) Date: Sep. 1, 2004

(87) PCT Pub. No.: WO03/026976

PCT Pub. Date: Apr. 3, 2003

(65) Prior Publication Data

US 2005/0006209 A1    Jan. 13, 2005

(30) Foreign Application Priority Data

Sep. 27, 2001   (DK) ............................. 2001 01412

(51) Int. Cl.
*B65G 15/48*   (2006.01)

(52) U.S. Cl. ............ 198/867.11; 198/349; 198/370.04; 198/867.12; 198/465.1

(58) Field of Classification Search ........... 198/867.11, 198/370.04, 53.1, 108, 349, 867.12, 465.1
See application file for complete search history.

(56) References Cited

U.S. PATENT DOCUMENTS

| | | | |
|---|---|---|---|
| 3,776,395 A | 12/1973 | Lingg et al. | |
| 4,686,719 A | 8/1987 | Johnson et al. | |
| 5,205,221 A * | 4/1993 | Melin et al. | 108/51.3 |
| 5,301,790 A * | 4/1994 | Prydtz et al. | 198/349 |
| 5,474,415 A * | 12/1995 | Becker et al. | 414/421 |
| 5,527,585 A * | 6/1996 | Needham et al. | 428/156 |
| 5,538,127 A | 7/1996 | Becker et al. | |
| 5,816,674 A * | 10/1998 | Manos et al. | 312/290 |
| 6,019,226 A * | 2/2000 | Zajdlik et al. | 206/600 |
| 6,166,133 A * | 12/2000 | Catsman | 525/67 |
| 6,265,977 B1 * | 7/2001 | Vega et al. | 340/572.7 |
| 6,292,968 B1 * | 9/2001 | McLain | 14/71.1 |
| 6,789,660 B1 * | 9/2004 | Bruun et al. | 198/347.1 |

FOREIGN PATENT DOCUMENTS

| | | |
|---|---|---|
| EP | 0 456 297 | 11/1991 |
| EP | 0 630 836 | 12/1994 |

(Continued)

OTHER PUBLICATIONS

International Search Report for PCT/DK02/00642.

*Primary Examiner*—Gene O. Crawford
*Assistant Examiner*—Kavel Singh
(74) *Attorney, Agent, or Firm*—Harness, Dickey & Pierce, P.L.C.

(57) ABSTRACT

A tote (1) used for conveying articles is transparent to x-rays in a conveyor system. At least a lower part (4) of the tote may be manufactured by injection molding rather than rotational molding. A wear-resistant material may also be employed for the lower part (4). The tote (1) may define a closed, hollow body, in which a damping device such as foam rubber, may be provided.

29 Claims, 12 Drawing Sheets

FOREIGN PATENT DOCUMENTS

| | | |
|---|---|---|
| EP | 0 659 624 | 6/1995 |
| EP | 0 742 163 | 5/1996 |
| EP | 1 125 871 | 8/2001 |
| WO | 98/25842 | 6/1998 |
| WO | 99/67160 | 12/1999 |
| WO | 01/05685 | 1/2001 |

* cited by examiner

TOTE FOR CONVEYOR

The present invention relates to a tote for a conveyor system in which the articles are conveyed in totes.

BACKGROUND

It is known to transport articles, in particular baggage, on conveyor systems in which the articles are situated in trays, boxes or totes, in order to treat the articles more careful and prevent damages on and wear of the articles and interruption of the operation of to the conveyor system caused by pendent parts of the articles, such as belts. The totes may be separated from the conveyor line, cf. EP-A-0 456 297, EP-A-0 742 163 and U.S. Pat. No. 5,301,790, to store the articles temporarily together with the tote.

The totes generally consist of two parts, a first part that supports the article to be transported, such as a tray having a concave surface as shown e.g. in U.S. Pat. No. 5,301,790, which prevents the article from sliding off the tote and facilitates the discharge of the article by tilting of the tray, and a second part to support the first part as well as transferring the driving force from the conveyor line to it and thereby to the article. Thus, the second part is exposed to heavy wear from the contact with the drive means of the conveyor and should therefore be manufactured from a wear-resistant material. For one of the known types, the second part is designed to engage dedicated conveyor and drive means and the wear-resistant material may be a glass-fibre reinforced plastics material, as disclosed in EP-A-0 581 398, or may be metal as disclosed in WO 01/05685. Another known type is the rotationally moulded tote having a hollow interior and a flat lower surface that support the tote on tilt trays, such as disclosed in U.S. Pat. No. 5,301,790, on belt drives, chutes, etc. The wear-resistance of materials that are suitable for rotational moulding is low but in so far as the totes are used solely on tilt trays, the wear-resistance properties of the rotationally moulded tote may suffice. The shape is advantageous because the totes may be transported on a multitude of different types of conveyors, but for use at conveyors with belt drives etc. in which the totes are driven directly, the wear-resistance of the material is insufficient and the lower surface of the rotationally moulded tote has to be reinforced by a sheet of a wear-resistant material, typically a steel sheet.

It is furthermore a known demand to conveyor systems that the articles transported thereon may be subjected to x-ray analysis, e.g. for quality inspection in production lines, but more commonly for security control of baggage for content of explosives, etc. To ensure the quality of the x-ray inspection which is performed with a vertical ray direction, it is required that material situated between the x-ray source and the x-ray detector is fairly transparent to x-rays and that the damping of the intersecting x-rays is substantially uniform throughout the inspected area perpendicular to the ray direction. As the known totes does not fulfil these requirements, mainly due to the presence of metal sheets or glass fibres, which both prevent the use of x-rays, the articles may in known systems be x-rayed before they are loaded onto the totes, the articles may be unloaded from the totes before the x-ray analysis and subsequently re-loaded onto the totes, or the totes may be separated in the first part carrying the article and the second metal part prior to the x-ray analysis, followed by a reunion of the two parts afterwards as disclosed in WO 01/05685. The tote manufactured by rotational moulding is in itself suitable for carrying articles for x-ray analysis but the material used for reinforcement of the lower surface severely reduces the x-ray transparency of the tote thus renders the tote unsuited for carrying articles during x-ray analysis thereof.

BRIEF DESCRIPTION OF THE INVENTION

The above-defined problem is according to the present invention solved by providing a tote for a conveyor system comprising
  an upper part defining an upper, article-supporting surface being of concave cross-section, and
  a lower part defining a lower, substantially plane bearing surface that extends an area substantially equal to the article-supporting surface,
  the upper part and the lower part being non-opaque i.e. transparent to x-rays, wherein the lower part is injection moulded from a plastics material, the plastics material being preferably wear resistant.

Accordingly, the invention provides a conveyor system which facilitates the x-ray analysis of the articles transported on a conveyor system utilising totes. The tote is preferably made from two parts that are assembled to form a hollow structure. At least the second, lower part may be injection moulded. It has been found to be advantageous to employ injection moulded parts, as injection moulding allows for the use of wear-resistant materials that render the reinforcement of the lower surface superfluous. Thereby, the tote may be made to be fairly transparent to x-rays and thus permit x-ray analysis of articles while being transported on the totes as opposed to the known, rotationally moulded and metal sheet reinforced totes and to the known totes with detachable lower parts.

The bearing surface may have openings defined in it as shown and discussed below without being outside the scope of the present invention. It is preferred that the bearing surface has substantially the same extent as the article-supporting surface, thus providing for the use of the tote on various types of conveyors as opposed to the previously discussed totes that are designed for conveyors dedicated only to that type of totes.

It is preferred that the x-ray transparency of the tote perpendicularly to the bearing surface is substantially homogeneous throughout substantially all of the tote so as to minimise the disturbances of an x-ray analysis of an article situated on the article-supporting surface of the tote. This is in a preferred embodiment obtained by designing and manufacturing the tote so that the total thickness of the material of the upper part and the lower part of the tote perpendicularly to the bearing surface is substantially homogeneous throughout substantially all of the tote. The total thickness is defined as the sum of the material thickness of the upper part and the material thickness of the lower part of the tote.

Both the upper part and the lower part may preferably be injection moulded from a wear-resistant plastics material in a preferred embodiment of the invention because not only the bearing surface but also other parts of the tote is subjected to wear, such as the side walls and end walls of the tote.

The preferred shape and type of the tote is one wherein the upper part and the lower part together form a substantially closed, hollow body. This construction, which is a kind of sandwich construction, is light weight and strong and is thus advantageous to some of the previously known totes, e.g. as disclosed in EP-A-0 581 398, in which the upper part is supported by the lower part at a middle section only, for which reason the upper part must be of a strong, self-supporting construction.

In a further preferred embodiment, the tote has outer sides extending between the article-supporting surface and the bearing surface, wherein said outer sides have one or more bumpers manufactured from a material of a higher wear-resistance than that of the lower part and preferably also of a lower surface friction coefficient, the bumpers extending along the outer sides covering at least part of the circumference of the tote. The bumpers protect the outer vertical sides of the tote, in particular the corners from wear and prolong thus the life of the tote.

The material used for the trays may e.g. be acrylonitrile butadiene styrene (ABS), polyamide (PA), polyethylene (PE) or plypropylene (PP) or a mixture thereof, and/or admixed with suitable materials for enhancing the wear-resistance and/or make the mixture fire-retardant. Of these, polyethylene has the best x-ray qualities. It is preferred embodiment that the wear-resistant plastics material comprises polycarbonate (PC) as well as acrylonitrile butadiene styrene (ABS).

In an example embodiment, the wear-resistant plastics material comprises polycarbonate (PC) as well as acrylonitrile butadiene styrene (ABS).

A damping means may be included in the hollow structure, i.e. in a cavity between the upper part and the lower part of the tote. This will silence the conveyor system when operated. The damping means may be made of e.g. foam rubber, preferably in a fire-retardant form.

BRIEF DESCRIPTION OF FIGURES

An embodiment of a tote according to the present invention is for illustration of the invention described below with reference to the accompanying drawings of which FIG. 1 shows a tote in 1A as seen from the side being parallel to the most common direction of movement of the tote on a conveyor, in 1B as seen from the end being perpendicular to the direction of movement, in 1C as seen from above and in 1D is shown a perspective view of the tote, the outer measures in millimeters of the tote appear from 1A and 1B, FIG. 1E displays a cross-section along A-A of FIG. 1C.

DETAILED DESCRIPTION OF THE EMBODIMENT

The embodiment of a tote 1 according to the invention as shown in the accompanying drawings is comprised of an upper part 2 defining an article-supporting surface 3 and a lower part 4, supporting the upper part 2 and defining a bearing surface 5 on which the tote 1 may be conveyed on multiple types of conveyors, including belt conveyors, roller conveyors and slides. The bearing surface 5 extends over substantially the same area as the article-supporting surface 3 so that forces may be transferred between the two surfaces 3, 5 at a plurality of support points and areas thus allowing a simple and slender construction. The wide area of the bearing surface 5 permit the tote 1 to be conveyed on multiple types of conveyors and the closed side walls 6 and end walls 7 connecting the article-supporting surface 3 and the bearing surface 5 transfer forces between the two surfaces 3, 5 as well as receive sideways impacts with the conveyors, in particular in conveyor sections that are curved in the horizontal plane in which the turning of the tote 1 is guided by vertical sides of the conveyor sections with which sides the totes 1 collides.

Figure 1A:
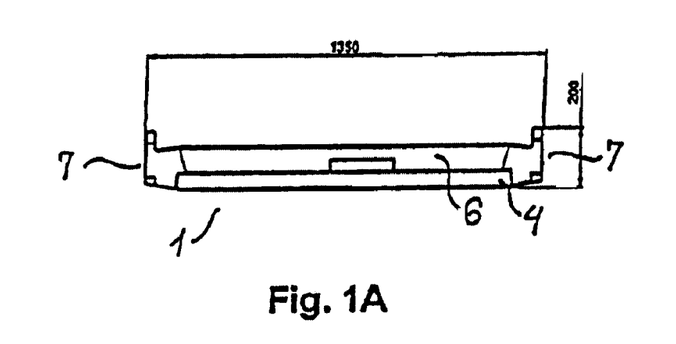
Figure 1B:
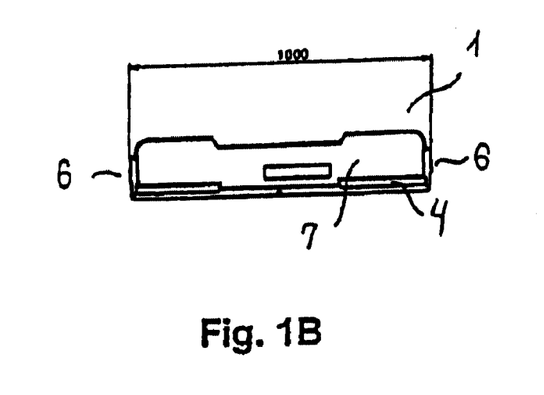
Figure 1C:
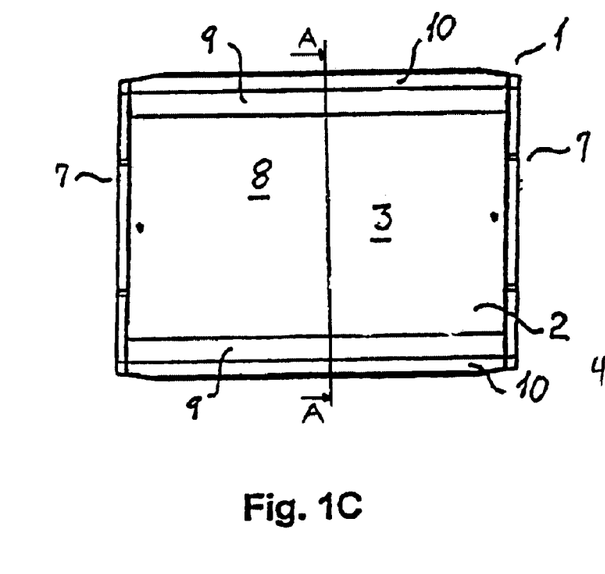
Figure 1D:
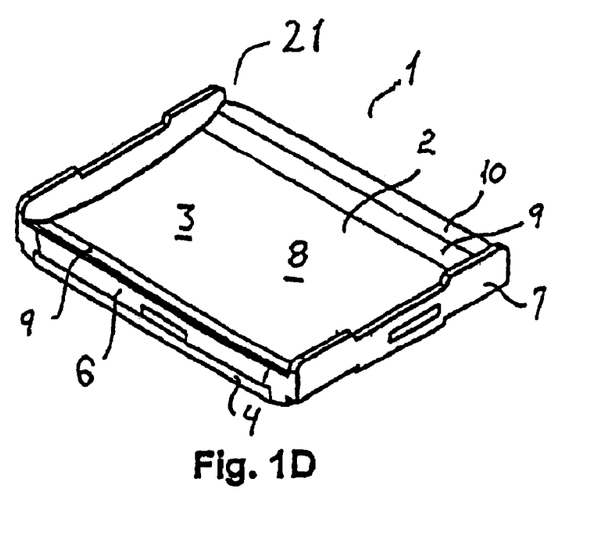
Figure 1E:
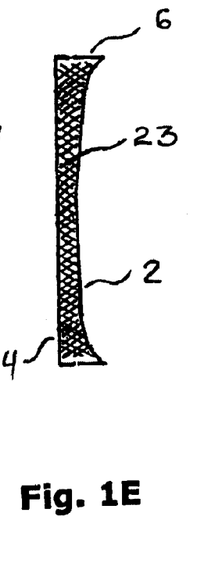
Figure 2:
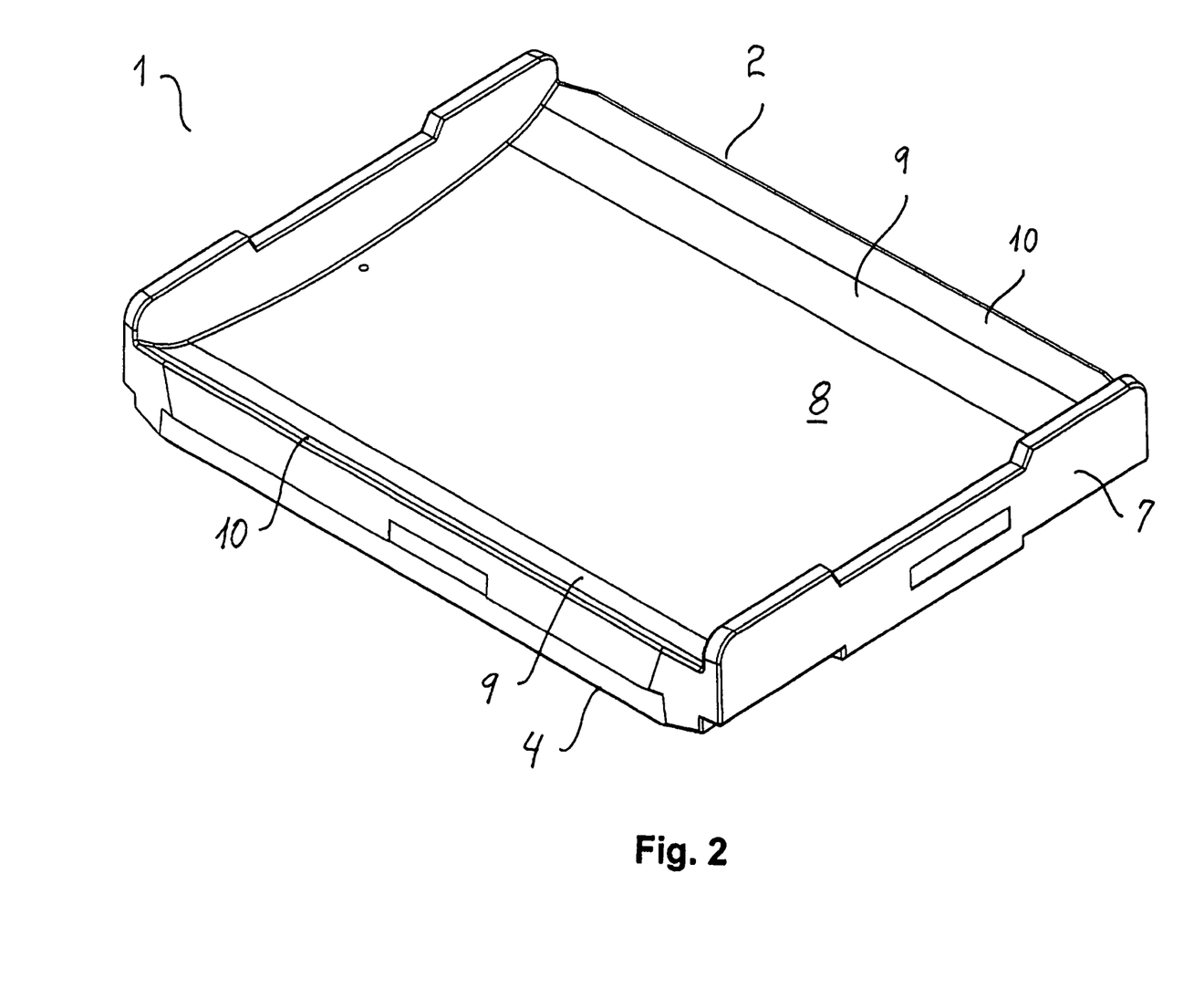
FIG. 2 is an enlarged perspective view of the tote as seen from above showing the article-supporting surface.

A damping device 23 (as shown in FIG. 1E) may be included in the hollow structure, e.g., in a cavity between an upper part and a lower part of the tote 1. The damping device 23 may silence the conveyor system when operated. The damping device 23 may be made of, for example, foam rubber, preferably in a fire-retardant form.

Figure 3:
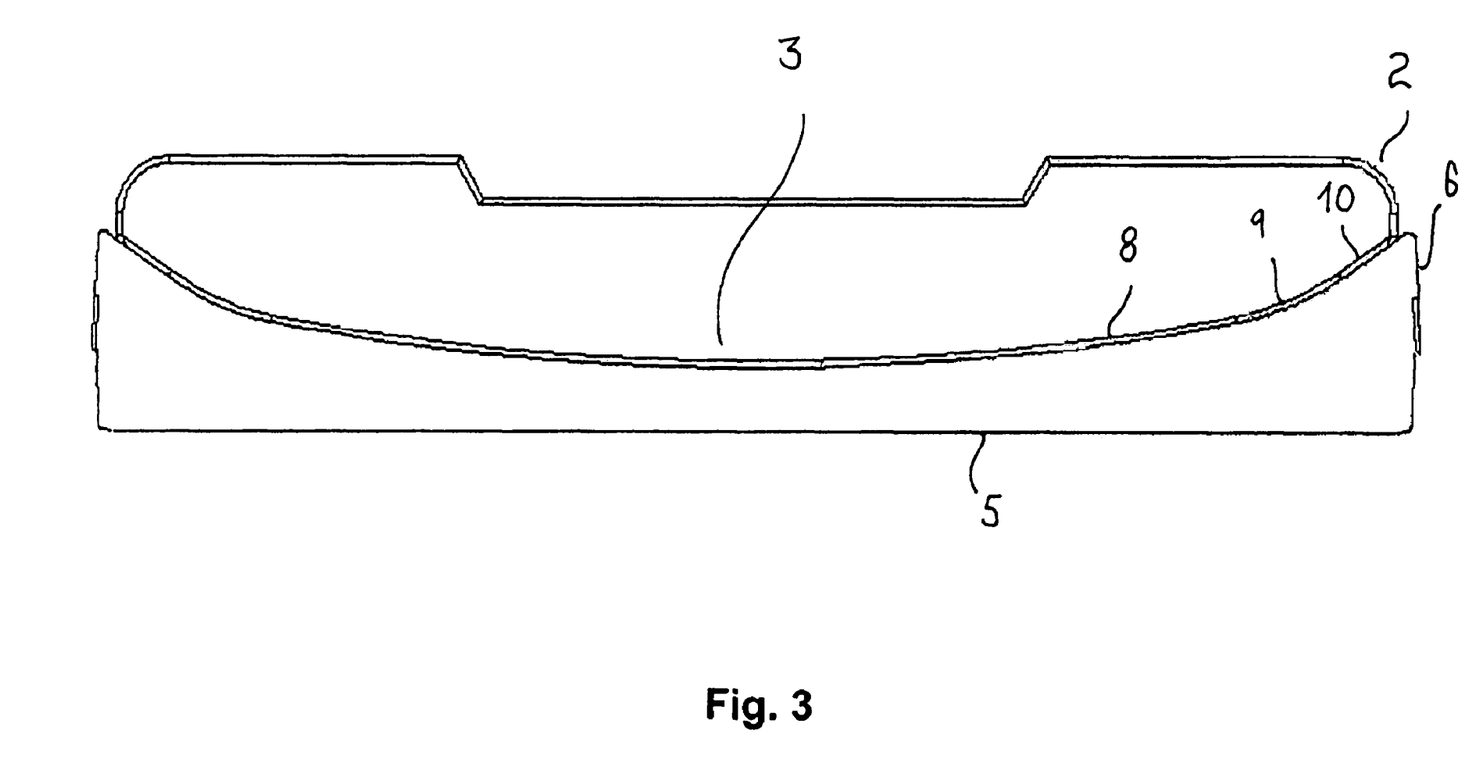
FIG. 3 is a cross section of the tote along a line perpendicular to the direction of movement.

The cross-section of the tote 1 perpendicular to the direction of movement, i.e., parallel to the end walls 7, is shown in FIG. 3. The concave shape of the article-supporting surface 3 consists of a middle section 8 with a low concavity, i.e., a long radius of curvature, two intermediate sections 9 with a high concavity, and two straight sections 10. The transition between sections 8, 9, and 10 is smooth so the tangent to the surface 3 is continuous along the cross-section and the friction of the surface 3 is low. Thereby, it is obtained that the articles remain in the tote 1 during conveying due to the height of the side walls 6 and the flatness of the middle section 8, whereas introduction of articles into the tote 1 and, in particular, discharge of articles from the tote 1 by tilting is facilitated by the curvature of the surface 3.

Figure 4:
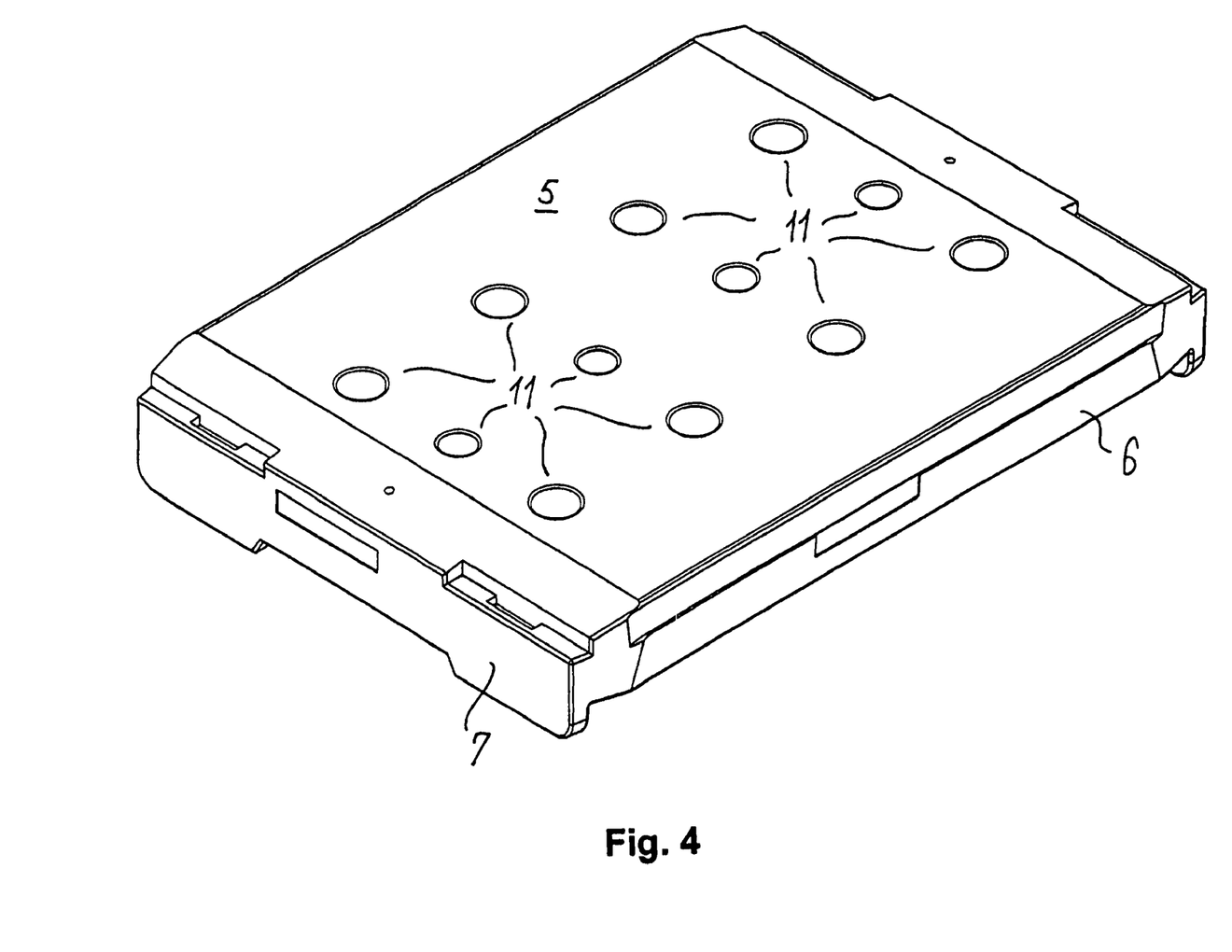
FIG. 4 is a perspective view of the tote as seen from below showing the bearing surface.
Figure 5:
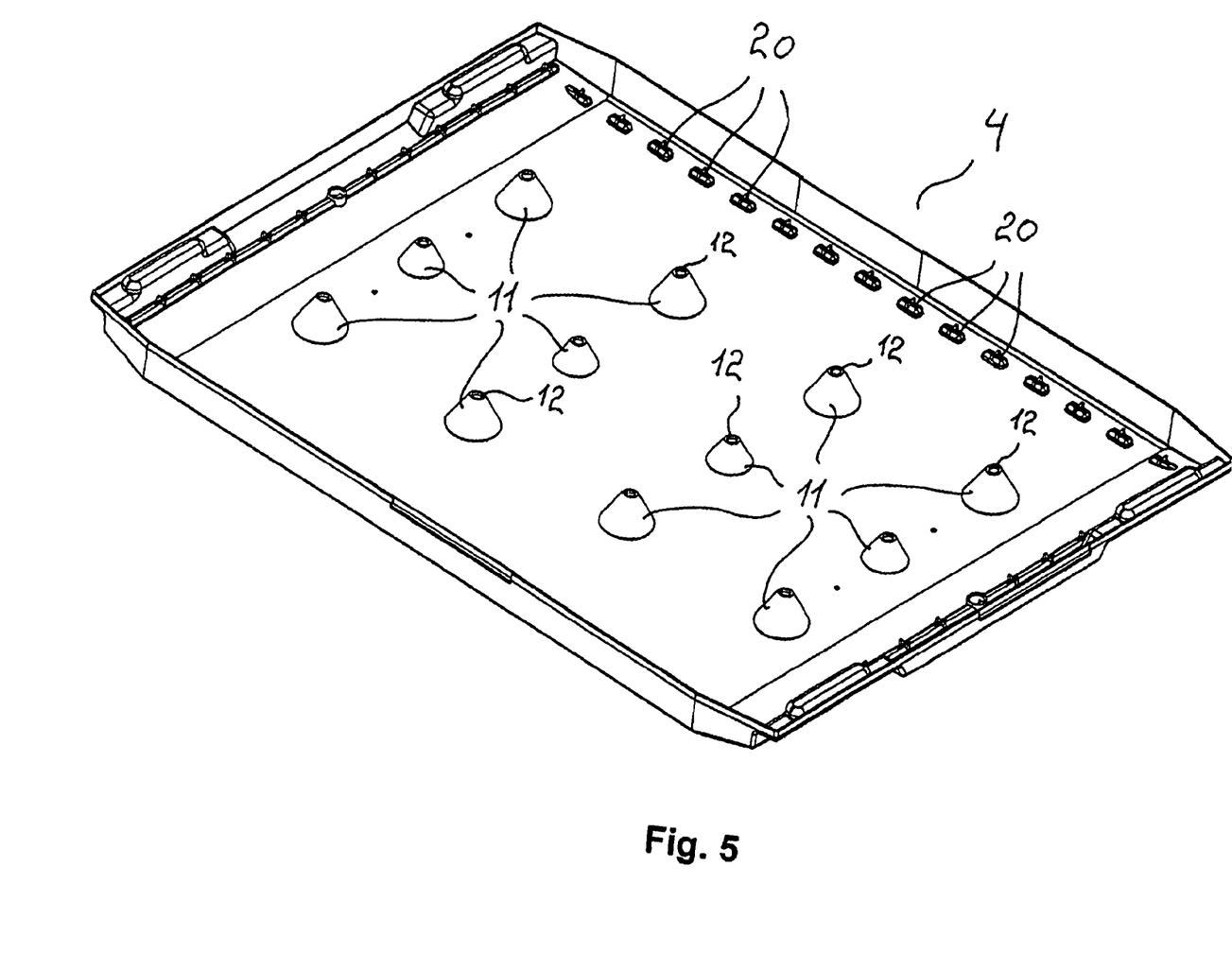
FIG. 5 is a perspective view of the lower part of the tote as seen from above, showing the interior side of the lower part.
Figure 6:
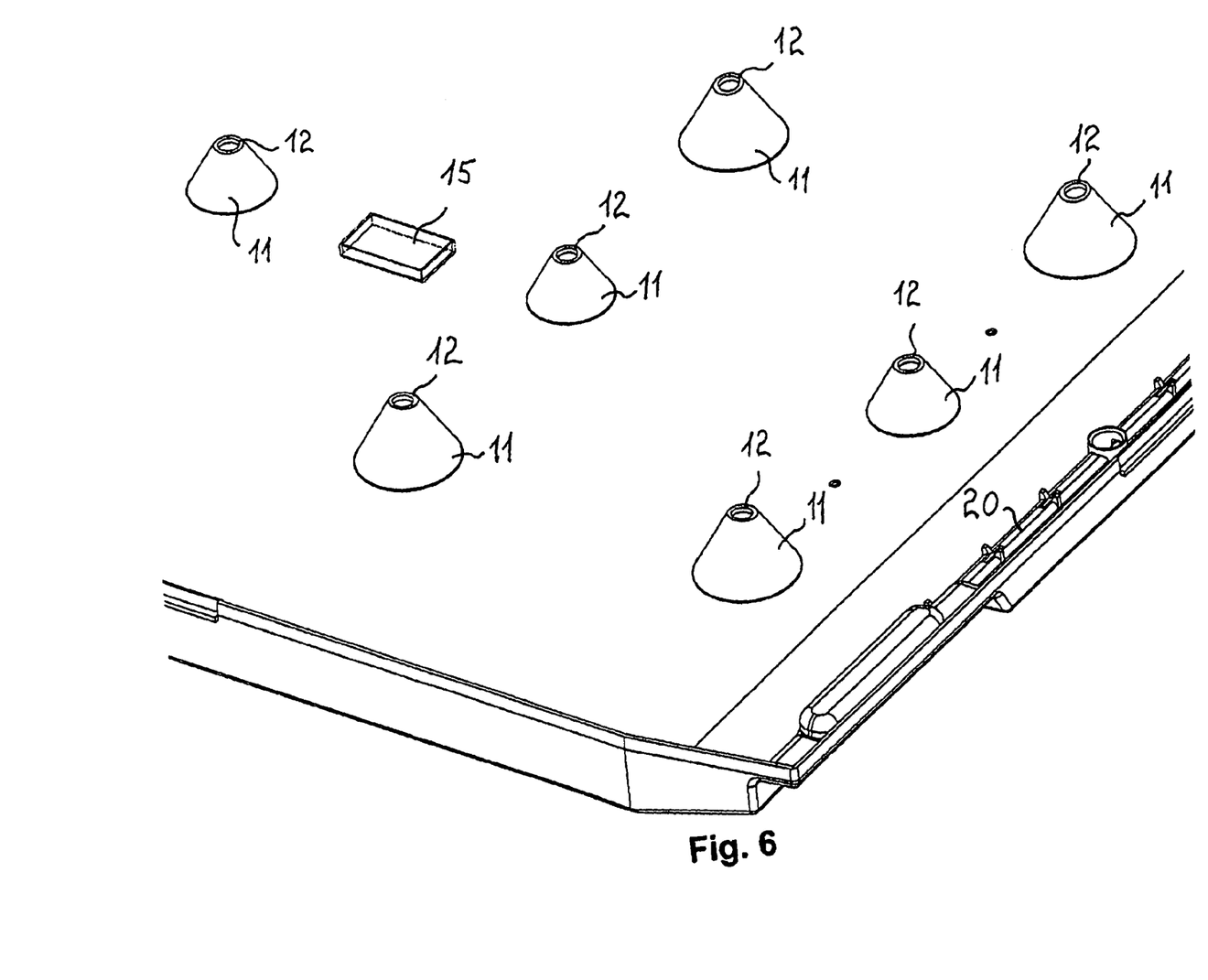
FIG. 6 is an enlarged detail of FIG. 5.
Figure 7:
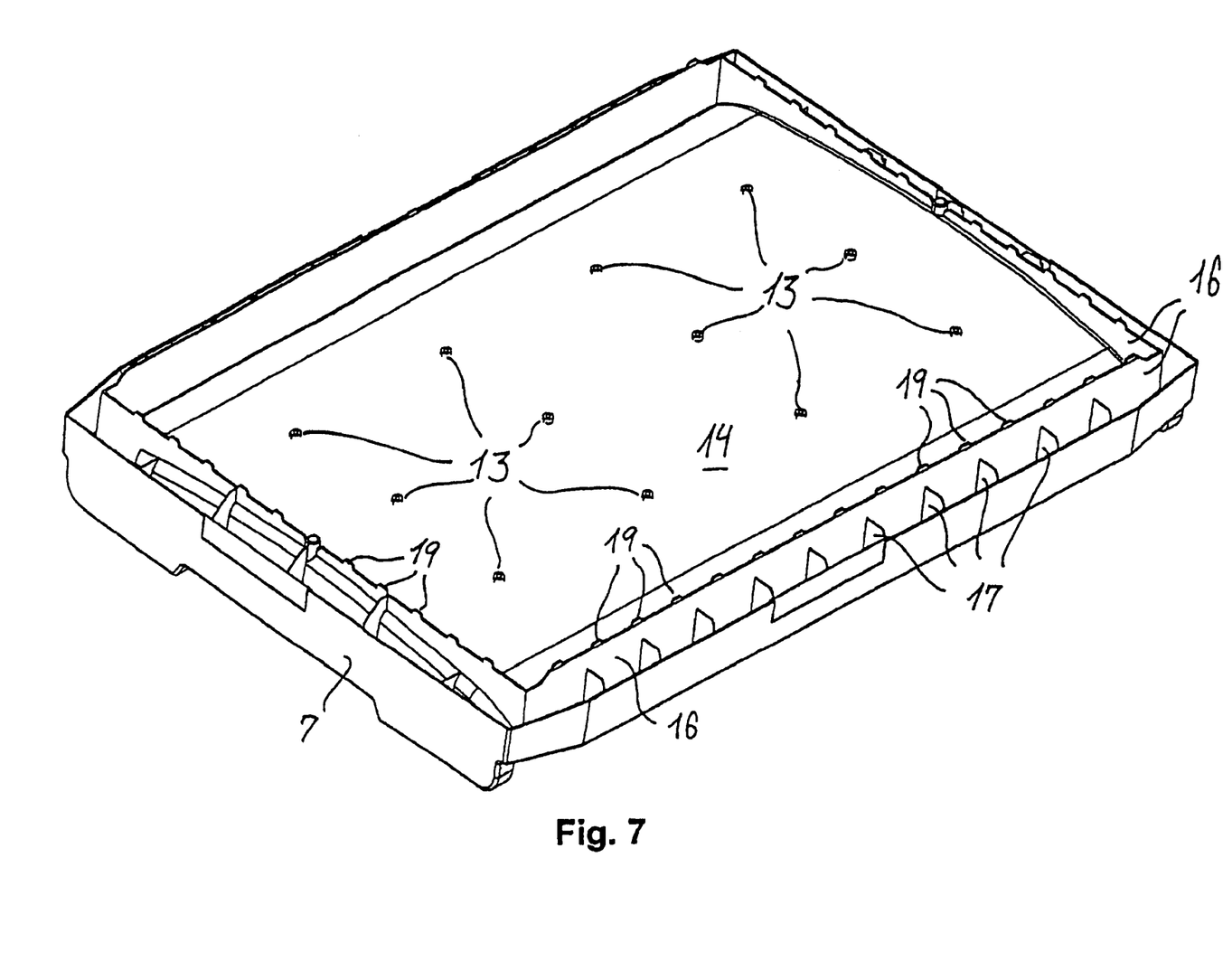
FIG. 7 is a perspective view of the upper part of the tote as seen from below.

The tote 1 is shown as seen from below in FIG. 4, from which the extent of the bearing surface 5 being substantially equal to the area of the article-supporting surface 3 is clearly seen. The bearing surface 5 provided with twelve hollow columns 11 that extend from the upper side of the lower part 4 leaving openings in the bearing surface 5. The columns 11 are formed as the frustum of a core as shown in FIGS. 5 and 6 and the upper end 12 of the columns 11 engages with complimentary openings 13 in the lower surface 14 of the upper part 2 as shown in FIG. 7. The columns 11 fulfill together with the side walls 6 and end walls 7 the function of supporting the upper part 2 of the tote 1 and thereby the article situated on the article-supporting surface 3. The close support of the upper part 2 from the lower part 4 allows for a slender and simple construction of the tote 1. Such close support could alternatively be achieved by a plurality of parallel ridge extending from the lower part 4 to the support of the upper part 2. The columns 11 are hollow because a sufficient compression strength is provided thereby and because an area of low transparency to x-rays is avoided, as would be the result of a massive column 11.

A compartment 15 for holding a machine readable identification unit, such as a RFID tag (radio frequency identification device tag), is provided in the lower part 4 as show in FIG. 6.

The upper part 2 is shown from below in FIG. 7, in which the structure of the side walls 6 and end walls 7 as sandwich constructions is shown, including an inner wall 16 and transverse ribs 17 connecting the inner wall 16 and the side walls 6 and the end walls 7, respectively. Thereby, a light weight as well as strong construction is obtained.

Figure 8:
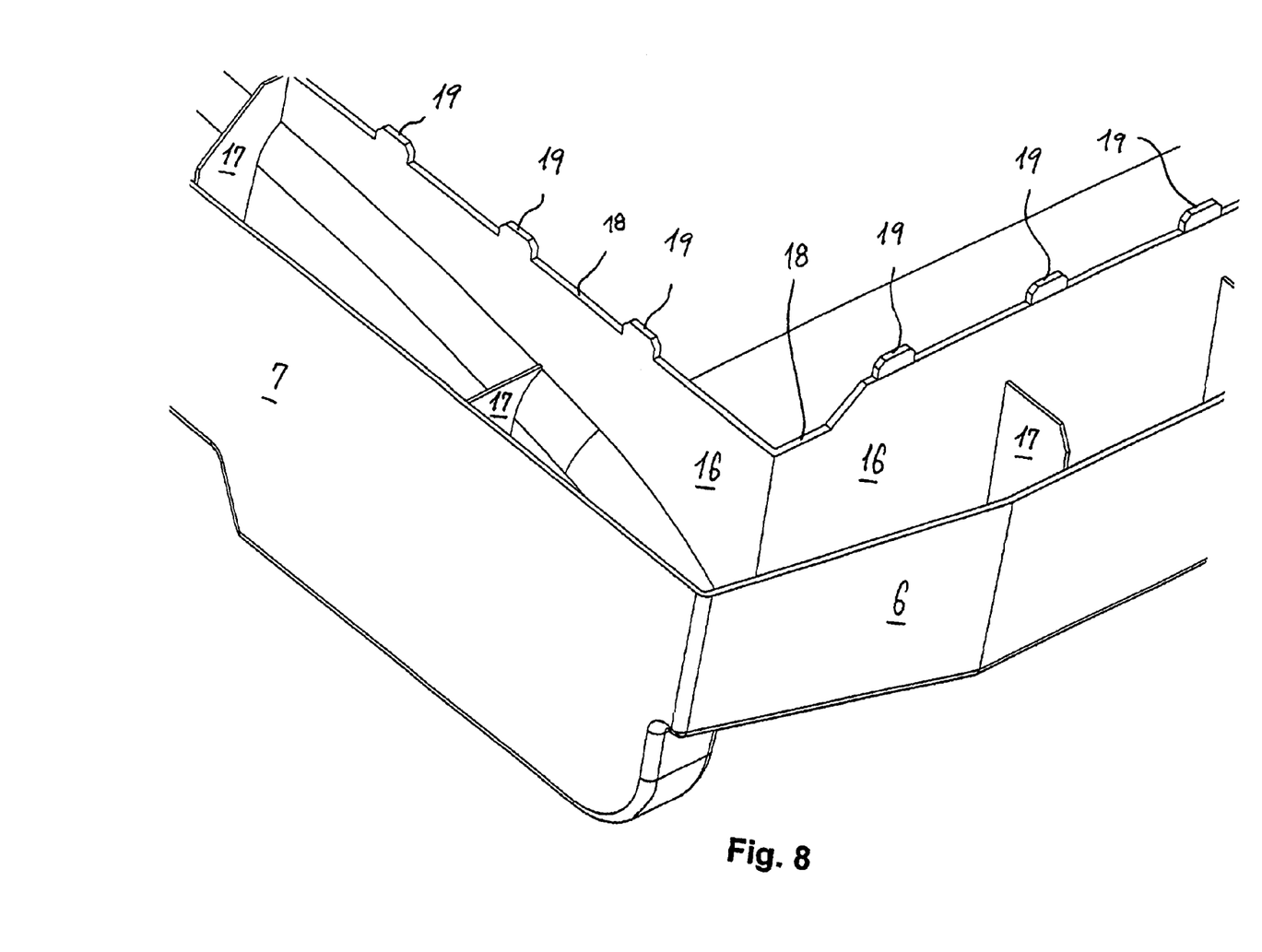
FIG. 8 is an enlarged detail of FIG. 7.
Figure 9:
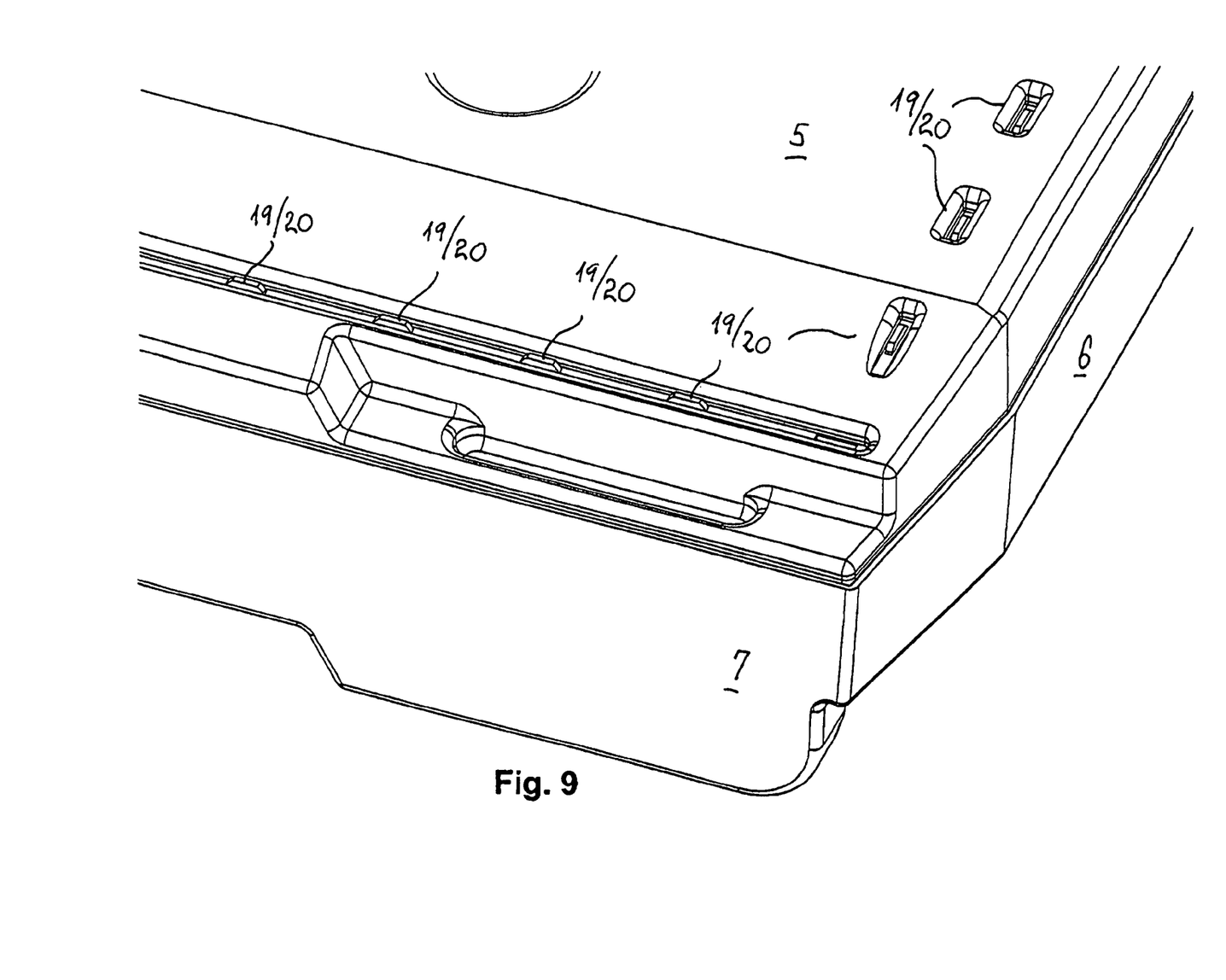
FIG. 9 is an enlarged detail of FIG. 4 showing details of the projections and slits used to gather the two parts of the tote.

FIG. 8 shows that the lower edge 18 of the inner wall 16 of the upper part 2 is equipped with a plurality of equidistant projections 19 that are formed to engage with corresponding slits 20 in the lower part 4, see FIGS. 5 and 6, and the projections 19 and the slits 20 are riveted together as shown in FIG. 9. Alternatively, the projections 19 and the slits 20 may be clicked together, using latch-formed projections, welded or glued together.

The upper part 2 and the lower part 4 of the tote 1 are designed so that the total material thickness between the article-supporting surface 3 and the bearing surface 5 in the direction perpendicular to the bearing surface 5 is substantially homogeneous throughout the tote 1 whereby it is obtained that the x-ray transparency of the tote perpendicularly to the bearing surface 5 is substantially homogeneous throughout substantially all of the tote 1. Thus, the disturbances of an x-ray analysis of an article situated on the article-supporting surface 3 of the tote 1 are minimised.

Figure 10:
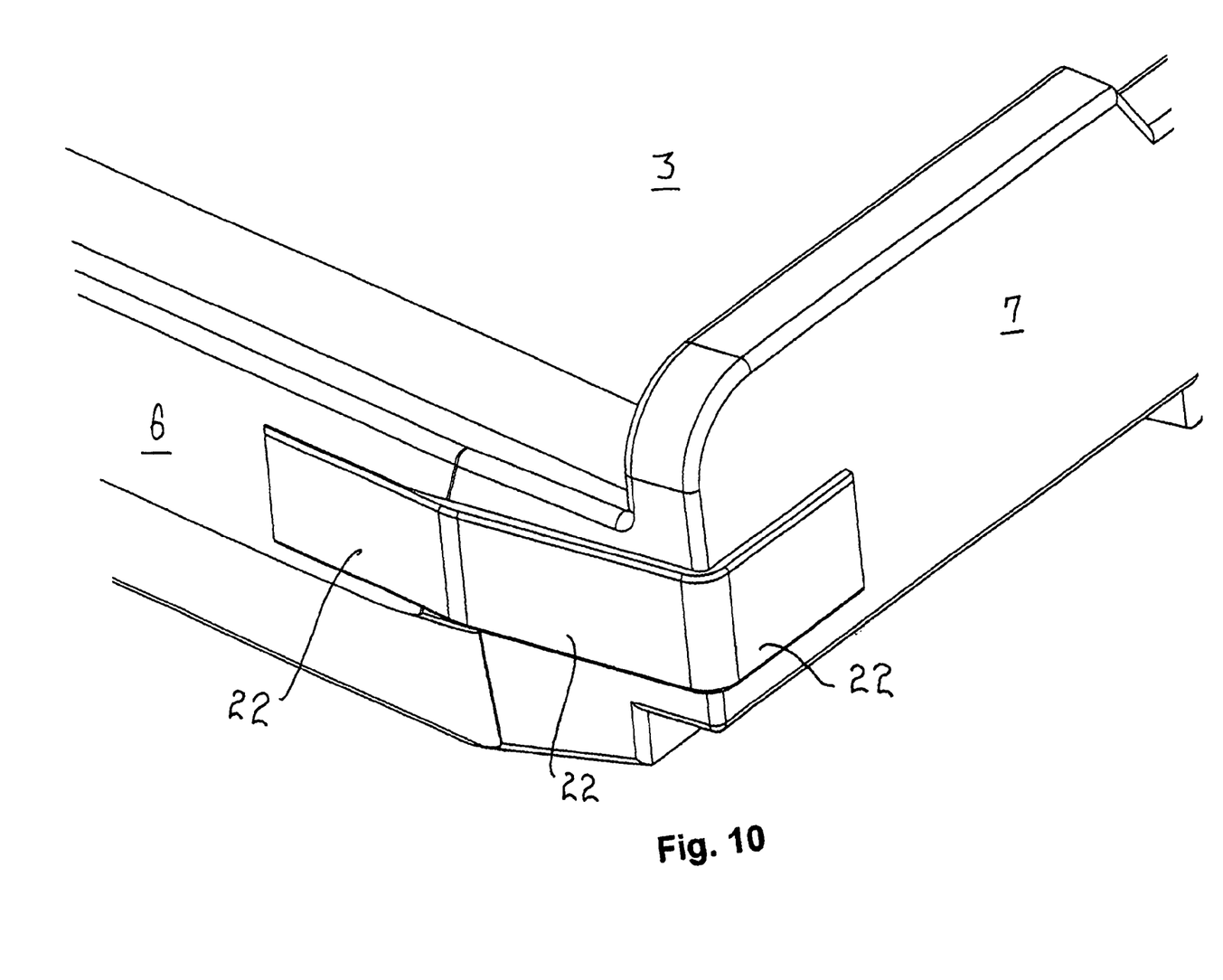
FIG. 10 shows a detail of a corner of a tote equipped with a bumper.

The wear on the tote 1 is in preferred configuration of the conveyor system most intensive on the side walls 6 and end walls 7, and in particular on the corners 21 where the two meet. The tote 1 is therefore in a further preferred embodiment provided with bumpers 22 manufactured from a material of a higher wear-resistance than that of the remaining tote 1 as shown in FIG. 10. Thus, the life of a tote 1 before recycling may be substantially prolonged by the application of bumpers 22.

Figure 11:
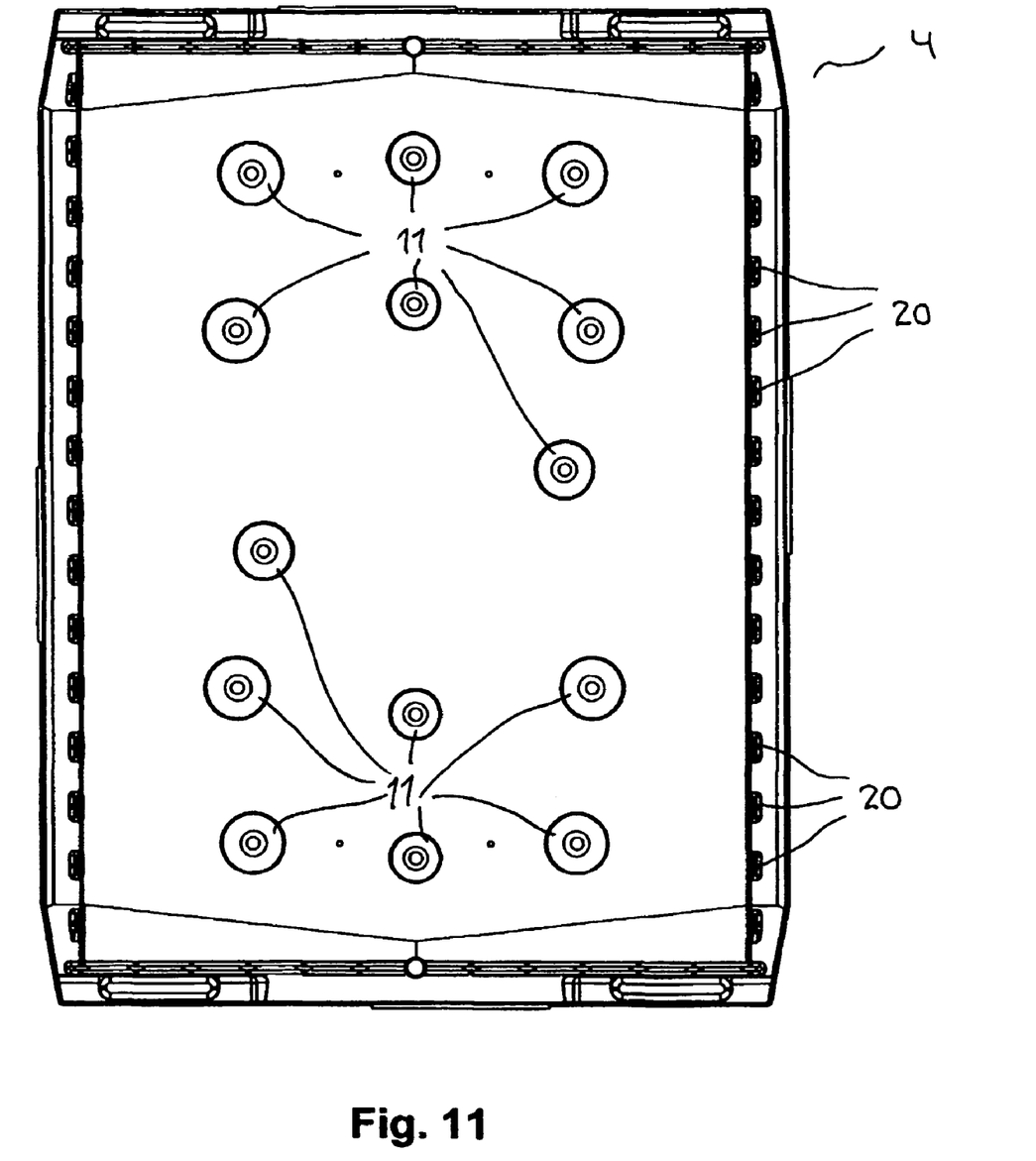
FIG. 11, shows the lower part of an alternative embodiment of the tote as seen from above, showing the interior side of the lower part.
Figure 12:
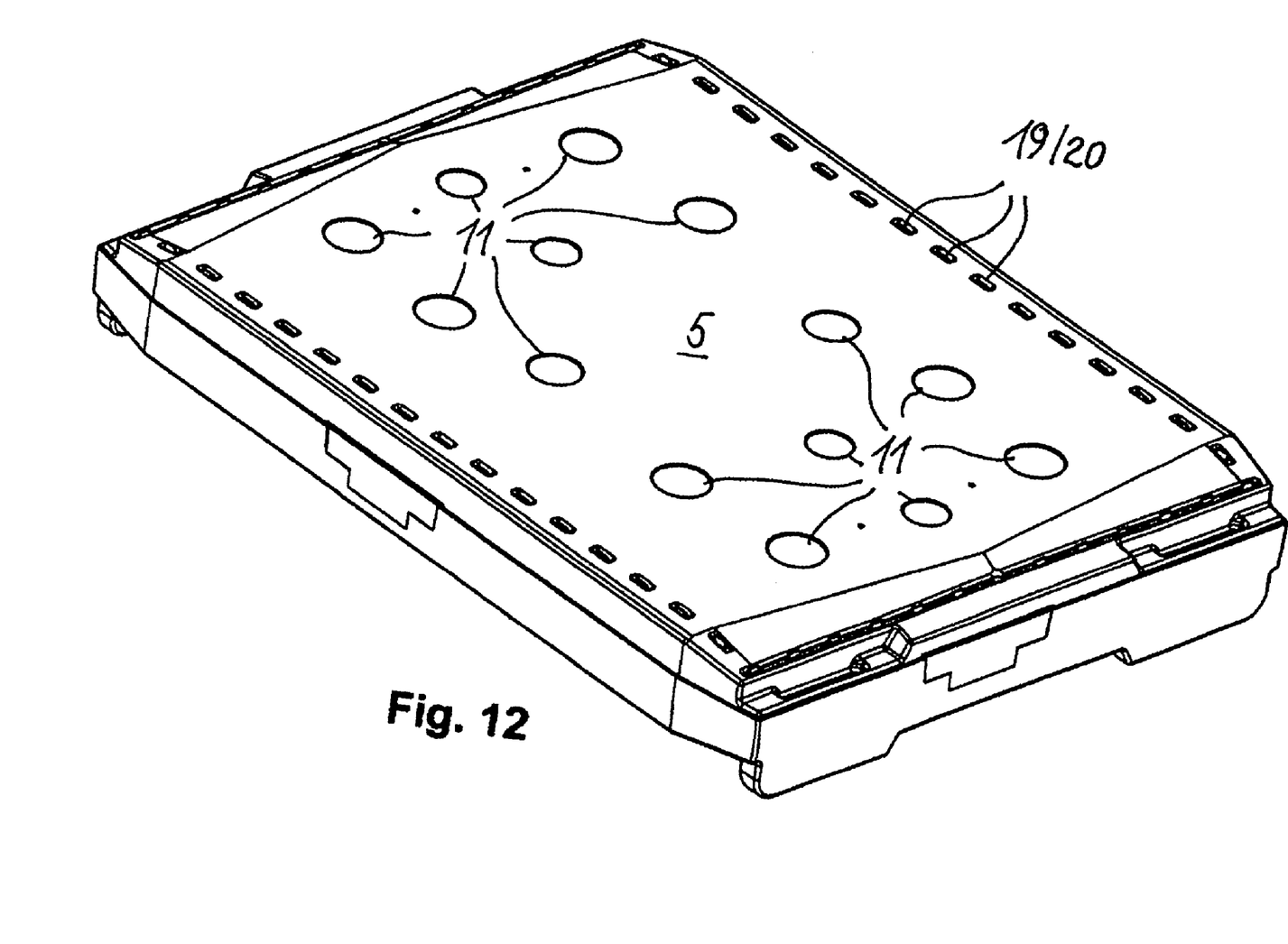
FIG. 12 is a perspective view of the alternative embodiment of the tote as seen from below showing the bearing surface.

An alternative embodiment of the tote 1 is shown as seen from below in FIG. 12. The bearing surface 5 is provided with fourteen different sized hollow columns 11 that extend from the upper side of the lower part 4 leaving openings in the bearing surface 5. The columns 11 are formed as the frustum of a cone as shown in a plan view in FIG. 11. The projections 19 and the slits 20, which are rivet together, are also shown in FIG. 11 and 12. Alternatively, the projections 19 and the slits 20 may be clicked together, using latch-formed projections, welded or glued together.

The invention claimed is:

1. A tote for a conveyor system, comprising:
an upper part; and
a lower part;
wherein the upper part defines an upper, article-supporting surface of concave cross-section,
wherein the article-supporting surface is adapted to receive and support articles while the articles are conveyed in or on the tote,
wherein the lower part defines a lower, substantially plane bearing surface that extends over an area substantially equal to the article-supporting surface,
wherein the upper part and the lower part together form a substantially closed, hollow body,
wherein the upper part is transparent to x-rays,
wherein the lower part is transparent to x-rays, and
wherein an x-ray transparency of the tote perpendicular to the bearing surface is substantially homogeneous throughout substantially all of the tote.

2. The tote of claim 1, wherein the lower part is injection molded from wear-resistant plastics material.

3. The tote of claim 1, wherein the upper part is injection molded from wear-resistant plastics material, and
wherein the lower part is injection molded from the wear-resistant plastics material.

4. The tote of claim 1, wherein a total thickness of the material of the upper part of the tote and the material of the lower part of the tote, perpendicular to the bearing surface, is substantially homogeneous throughout substantially all of the tote.

5. The tote of claim 1, further comprising:
a damping device;
wherein the damping device is disposed in the substantially closed, hollow body.

6. The tote of claim 1, further comprising:
outer sides;
wherein the outer sides extend between the article-supporting surface and the bearing surface,
wherein the outer sides include one or more bumpers,
wherein the one or more bumpers are made from material of higher wear-resistance than that of the material of the lower part,
wherein the one or more bumpers extend along the outer sides, and
wherein the one or more bumpers cover at least part of a circumference of the tote.

7. The tote of claim 2, wherein the wear-resistant plastics material comprises:
polycarbonate (PC); and
acrylonitrile butadiene styrene (ABS).

8. The tote of claim 1, further comprising:
a supporting device;
wherein the supporting device supports the upper part, and
wherein the supporting device rests on the lower part.

9. The tote of claim 8, wherein the supporting device comprises:
a plurality of hollow columns;
wherein the columns extend from an upper side of the lower part, leaving openings in the bearing surface,
wherein the columns are formed as frustums of a cone,
wherein the tote further comprises:
openings in a lower surface of the upper part;
wherein the openings are complimentary with respect to upper ends of the columns, so that the upper ends engage with the openings.

10. A tote for a conveyor system, comprising:
an upper part; and
a lower part;
wherein the upper part defines an upper, article-supporting surface,
wherein the article-supporting surface is adapted to receive and support articles while the articles are conveyed in or on the tote,
wherein the lower part defines a lower, substantially plane bearing surface that extends over an area substantially equal to the article-supporting surface,
wherein the upper part is transparent to x-rays,
wherein the lower part is transparent to x-rays, and
wherein an x-ray transparency of the tote perpendicular to the bearing surface is substantially homogeneous throughout substantially all of the tote.

11. The tote of claim 10, wherein the lower part is injection molded from wear-resistant plastics material.

12. The tote of claim 11, wherein the upper part is injection molded from the wear-resistant plastics material.

13. The tote of claim 11, wherein the wear-resistant plastics material comprises:
   polycarbonate (PC); and
   acrylonitrile butadiene styrene (ABS).

14. The tote of claim 10, wherein the upper part comprises one or more of acrylonitrile butadiene styrene (ABS), polyamide (PA), polyethylene (PE), and polypropylene (PP).

15. The tote of claim 10, wherein the upper part and the lower part are made from fire-retardant material.

16. The tote of claim 10, wherein a total thickness of the material of the upper part of the tote and the material of the lower part of the tote, perpendicular to the bearing surface, is substantially homogeneous throughout substantially all of the tote.

17. The tote of claim 10, wherein the upper part and the lower part together form a substantially closed, hollow body.

18. The tote of claim 17, further comprising:
   a damping device;
   wherein the damping device is disposed in the substantially closed, hollow body.

19. The tote of claim 10, further comprising:
   outer sides;
   wherein the outer sides extend between the article-supporting surface and the bearing surface,
   wherein the outer sides include one or more bumpers,
   wherein the one or more bumpers are made from material of higher wear-resistance than that of the material of the lower part,
   wherein the one or more bumpers extend along the outer sides, and
   wherein the one or more bumpers cover at least part of a circumference of the tote.

20. The tote of claim 10, wherein the article-supporting surface has a concave cross-section.

21. The tote of claim 10, wherein the upper part and the lower part are adapted to be one or more of riveted together, clicked together, welded together, and glued together.

22. The tote of claim 10, further comprising:
   a compartment for holding a machine-readable identification unit.

23. The tote of claim 22, wherein the compartment is provided in the lower part.

24. The tote of claim 22, wherein the machine-readable identification unit is a radio-frequency identification device (RFID) tag.

25. The tote of claim 10, further comprising:
   a supporting device;
   wherein the supporting device supports the upper part, and
   wherein the supporting device rests on the lower part.

26. The tote of claim 25, wherein the supporting device comprises:
   a plurality of hollow columns;
   wherein the columns extend from an upper side of the lower part, leaving openings in the bearing surface,
   wherein the columns are formed as frustums of a cone,
   wherein the tote further comprises:
      openings in a lower surface of the upper part;
   wherein the openings are complimentary with respect to upper ends of the columns, so that the upper ends engage with the openings.

27. The tote of claim 10, further comprising:
   a damping device;
   wherein the damping device is disposed between the upper part and the lower part, and
   wherein the damping device is made of foam rubber.

28. The tote of claim 10, further comprising:
   a damping device;
   wherein the damping device is disposed between the upper part and the lower part, and
   wherein the damping device is transparent to x-rays.

29. The tote of claim 10, wherein the lower part comprises one or more of acrylonitrile butadiene styrene (ABS), polyamide (PA), polyethylene (PE), and polypropylene (PP).

* * * * *